R. H. BENNETT.
ILLUMINATION LIGHT.
APPLICATION FILED DEC. 6, 1920.

1,389,180.

Patented Aug. 30, 1921.
2 SHEETS—SHEET 1.

Inventor
R. H. Bennett

By
Attorney

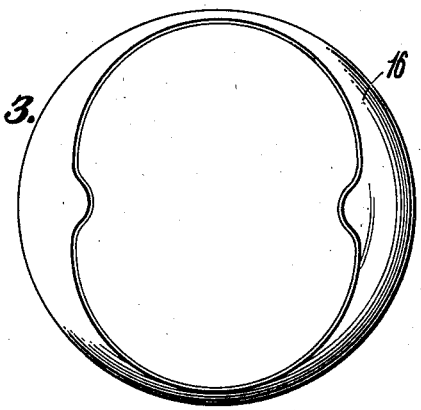
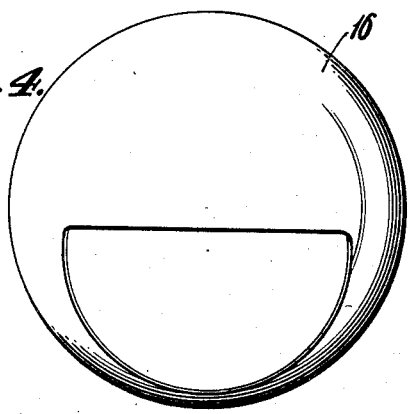
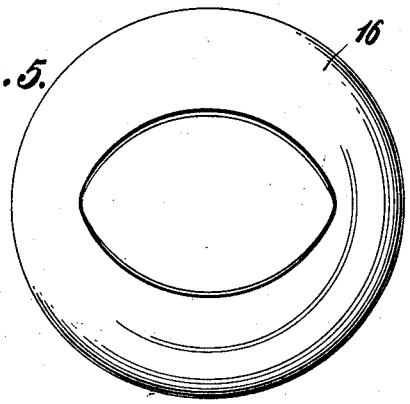
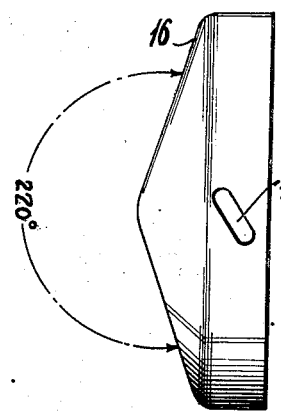
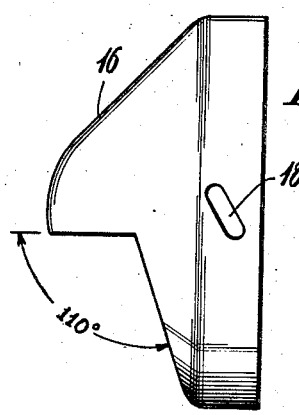
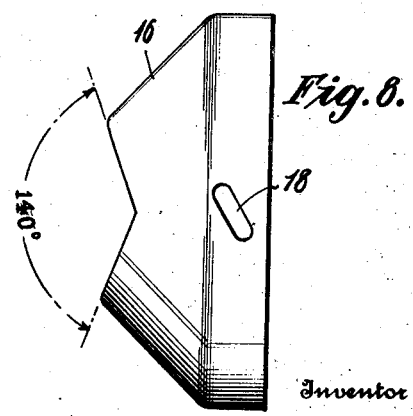

UNITED STATES PATENT OFFICE.

ROBERT H. BENNETT, OF WASHINGTON, DISTRICT OF COLUMBIA.

ILLUMINATION-LIGHT.

1,389,180.  Specification of Letters Patent.  Patented Aug. 30, 1921.

Application filed December 6, 1920. Serial No. 428,570.

*To all whom it may concern:*

Be it known that I, ROBERT H. BENNETT, a citizen of the United States, residing at Washington, District of Columbia, have invented new and useful Improvements in Illumination-Lights, of which the following is a specification.

This invention relates to improvements in illumination lights, and particularly navigational lights for aircraft.

Navigational lights for aircraft must not only be visible through the specified angles in azimuth but must be visible as well through specified angles in the vertical. Aircraft must carry lights which will be visible both above and below the plane of flight in addition to the visibility required to left and right of the line of flight.

One of the objects of the present invention is to provide a simple and practical light of the above general character, designed to give the desired angles of illumination which are now or which may be in the future required as the angles of visibility for the prescribed lights of aircraft, either forward, aft or on each side.

A further object is to provide an improved form of light provided with a holder and shield for the globes or lenses of the lights so constructed, positioned or arranged as to protect the source of light from the elements and at the same time permit the emission of light rays in the desired dihedral angle. A further object is to provide an improved aircraft light which may be inexpensive to manufacture, assemble and install. Other objects will be in part obvious and in part hereinafter pointed out.

In the accompanying drawings is shown one of the various possible embodiments of my invention together with several views showing modified forms of lens holders. Similar reference characters denote corresponding parts in the different views.

Figs. 3, 4 and 5 are front elevational views of the lens holders while Figs. 6, 7 and 8 are respectively plan views of the holders shown in Figs. 3, 4 and 5.

Figure 1:
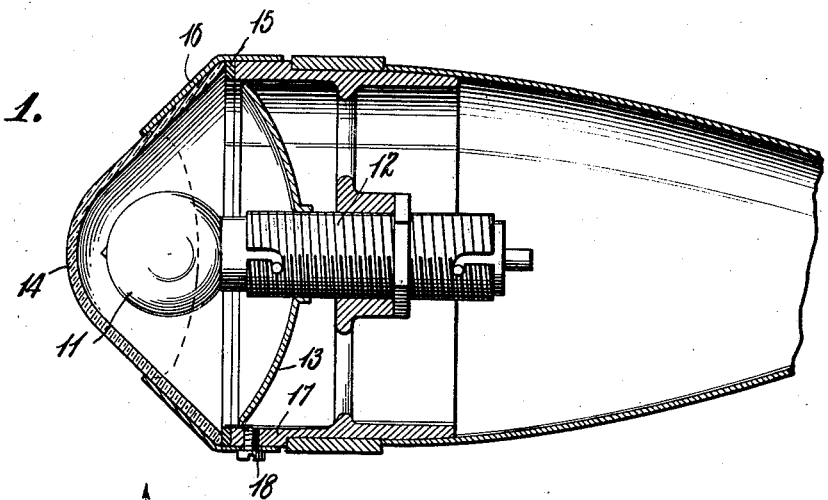
Figure 1 is a side sectional, elevational view showing such parts of the complete device as are necessary to fully understand the invention.
Figure 2:
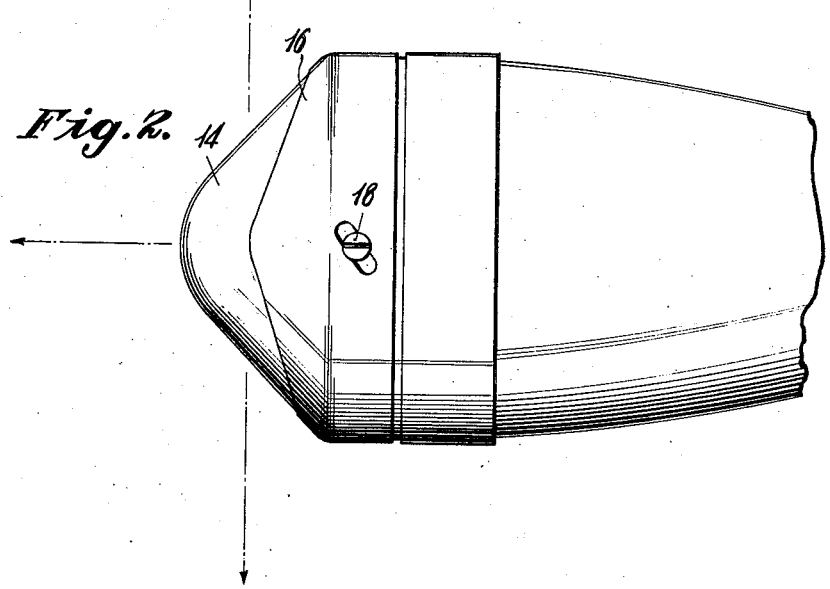
Fig. 2 is a view of the lamp looking downwardly and indicating the angle of visibility.

Referring now the drawings in detail and more particularly to Fig. 1, 11 denotes a source of light of any desired form such for example a standard spherical lamp bulb adapted to be mounted in a retaining socket 12, capable of adjustment in a fore and aft direction with respect to the axis of the lamp. A reflector 13 is attached to the socket 12. A globe or lens 14 of conical convex or dome shape transparent glass or other material is applied at the front, its circular base firmly seated against a gasket or washer 15 by virtue of the pressure exerted on the globe by a retaining shield 16.

This shield is represented in Fig. 1 as preferably of metal and may take the form either as shown in this figure or the several modified views, Figs. 3, 4 and 5. The holder 16 is attached to the main body of the lamp fixture 17, in such a manner that it may be brought back against the globe or lens with any amount of pressure desired and held in that position indefinitely by screw and slot 18.

The shield 16 is cylindrical in form over that portion which is fitted to the body 17, and is substantially conical in form over that portion which embraces and holds the lens or globe 14. The opening over this portion of the shield for the emission of light is obtained by cutting the shield with two vertical planes. The angle between the planes is the angle of visibility required for the light, thus—In Fig. 3, the shield 16 is of a form suitable for obtaining a dihedral angle of illumination through 220° bisected by the vertical plane through the axis of the lamp.

In Fig. 4 the retaining shield is of a form suitable for obtaining a dihedral angle of 110° visibility when measured between two vertical planes one of which is parallel to the axis of the lamp.

In Fig. 5 there is illustrated a retaining shield of a form suitable for obtaining a dihedral angle of 140° visibility bisected by a plane through the axis of the lamp.

The above merely gives a brief description of the invention under particular construction and arrangement, but it is understood that the invention is not to be limited to the specific construction herein illustrated and described. The invention is of simple and practical construction and the angle of illumination may be easily and quickly modified by substituting a shield of different type such as shown in Figs. 3, 4 and 5, according to the requirements to which the light is to be placed.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim as my invention:

1. In a device of the character described, in combination, a lamp casing having an opening, a substantially conical globe covering said opening in the lamp casing, a source of light within the casing and in close proximity to the apex of said globe, a shield operatively associated with the globe having an opening formed by the intersection of two planes permitting the emission of light through a dihedral angle.

2. In a device of the character described, in combination, a lamp casing having an opening, a substantially conical globe covering said opening in the lamp casing, a source of light within the casing and in close proximity to the apex of said globe, a shield operatively associated with the globe having an opening formed by the intersection of two planes permitting the emission of light through a dihedral angle and means permitting the lamp to be adjusted toward and from said globe thereby to vary the angularity of the dihedral angle.

3. In a device of the character described, in combination, a lamp casing having an opening, a substantially conical globe covering the opening, a source of light within the casing and in close proximity to the apex of said globe, a shield detachably mounted on the lamp casing and positioned outside of said globe having an opening formed by the intersection of two planes thereby permitting the emission of light through a dihedral angle.

4. In a device of the character described, in combination, a lamp casing having an opening, a substantially conical globe covering the opening, a source of light within the casing and in close proximity to the apex of said globe, a shield detachably mounted on the lamp casing and positioned outside of said globe having an opening formed by the intersection of two planes thereby permitting the emission of light through a dihedral angle and means within the lamp casing supporting the source of light permitting said source of light to be adjusted toward and from the lamp globe.

Signed at Washington, D. C., this 25th day of October, 1920.

ROBERT H. BENNETT.